United States Patent
Smith

(10) Patent No.: US 8,196,660 B2
(45) Date of Patent: Jun. 12, 2012

(54) METHOD AND APPARATUS TO TREAT WELL STIMULATION FLUIDS IN-SITU

(76) Inventor: David Randolph Smith, Kilgore, TX (US)

( * ) Notice: Subject to any disclaimer, the term of this patent is extended or adjusted under 35 U.S.C. 154(b) by 314 days.

(21) Appl. No.: 12/371,581

(22) Filed: Feb. 14, 2009

(65) Prior Publication Data

US 2009/0205821 A1 Aug. 20, 2009

Related U.S. Application Data

(60) Provisional application No. 61/028,729, filed on Feb. 14, 2008.

(51) Int. Cl.
*E21B 43/22* (2006.01)
*E21B 47/01* (2012.01)
*C09K 8/62* (2006.01)

(52) U.S. Cl. ............ 166/305.1; 166/300; 166/313; 166/250.01; 507/935

(58) Field of Classification Search ............ 166/305.1, 166/306, 270.1, 270, 313, 77.1, 77.2, 77.3; 507/935
See application file for complete search history.

(56) References Cited

U.S. PATENT DOCUMENTS

| | | | | |
|---|---|---|---|---|
| 2,001,350 A | * | 5/1935 | Van Auken | 166/300 |
| 2,345,713 A | * | 4/1944 | Moore et al. | 166/305.1 |
| 2,672,201 A | * | 3/1954 | Lorenz | 166/302 |
| 3,467,195 A | * | 9/1969 | Johnson, Jr. et al. | 166/371 |
| 3,531,409 A | * | 9/1970 | Seffens et al. | 507/203 |
| 3,730,273 A | * | 5/1973 | Wilson | 166/269 |
| 4,336,145 A | * | 6/1982 | Briscoe | 507/211 |
| 4,456,069 A | * | 6/1984 | Vigneri | 166/303 |
| 4,649,994 A | * | 3/1987 | Chaudot | 166/68 |
| 5,275,038 A | * | 1/1994 | Sizer et al. | 73/152.02 |
| 5,370,184 A | | 12/1994 | McDougall et al. | |
| 5,538,081 A | | 7/1996 | Rippetoe et al. | |
| 6,719,054 B2 | * | 4/2004 | Cheng et al. | 166/308.2 |
| 6,913,079 B2 | | 7/2005 | Tubel | |
| 7,055,600 B2 | | 6/2006 | Messier et al. | |
| 2001/0046414 A1 | | 11/2001 | Kinsman | |
| 2003/0196811 A1 | * | 10/2003 | Crawford et al. | 166/300 |

OTHER PUBLICATIONS

International Search Report issued Apr. 8, 2009, during the prosecution of International Application No. PCT/US09/34166.
Written Opinion issued Apr. 8, 2009, during the prosecution of International Application No. PCT/US09/34166.

* cited by examiner

*Primary Examiner* — Kenneth L Thompson
(74) *Attorney, Agent, or Firm* — Fulbright & Jaworski L.L.P.

(57) ABSTRACT

A method and apparatus for the management of injection and production of well fluids in a subterranean well is described to optimize the use of stimulation fluids to enhance their compatibility with subterranean reservoirs and the surface environment and thereby reducing the damage said fluids induce in subterranean reservoirs and upon flow back to the surface reduce their damage to the environment is described. More specifically, this method is directed to the subterranean treatment of injection fluids.

31 Claims, 3 Drawing Sheets

METHOD AND APPARATUS TO TREAT WELL STIMULATION FLUIDS IN-SITU

CROSS-REFERENCE TO RELATED APPLICATIONS

This application claims priority to U.S. provisional application Ser. No. 61/028,729, filed on Feb. 14, 2008.

TECHNICAL FIELD

The present invention is directed to a subterranean mixing method and apparatus to treat well fluids to enhance their compatibility with subterranean reservoirs reducing the damage said fluids induce in subterranean reservoirs and to improve the environmental compatibility of well fluids produced to the surface. More specifically, this invention is directed to the subterranean treatment of fluids.

BACKGROUND OF THE INVENTION

When a fluid, such as oil and natural gas, is being produced from a subterranean reservoir through a wellbore, the ability of the reservoir to produce hydrocarbons and other fluids is often enhanced by processes that inject fluids and solids from surface into the well reservoir. These fluids are known to those of skill in the art of oil and gas production as stimulation fluids or hydraulic fracturing fluids and the injection process at a well site in which they are used is often referred to as a stimulation or fracture treatment. The fluids to be injected are often mixed at surface with a variety of chemicals and solids prior to injection. A wide variety of fluid types may be used including freshwater, saltwater, nitrogen, carbon dioxide, hydrogen peroxide, acids, bases, surfactants, alcohols, diesel, propane, liquid natural gas, and many more fluids which are well known to those of skill the upstream oil and gas industry. Oftentimes, there are additional chemicals and fluids mixed at surface and injected in such a stimulation processes in order to improve the ability of the reservoir to produce the injected stimulation fluids back to surface. This is because the stimulation fluids remaining in the reservoir or the chemicals transported by said fluids can often times reduce the ability of the reservoir to produce desired fluids into the well. Additionally, typical stimulation practice involves combining, at the surface, viscosity agents, cross-linkers, and possibly other components, to the stimulation fluid, enhancing the ability of the fluids to transport solids into the reservoirs, create hydraulic fracture growth or both. A still further reason to add chemicals (including but not limited to guars such as such as hydroxypropyl guars, polyacrylamides, cellulose gelling agents, miscellars, surfactants, and others) to stimulation fluids is to reduce the hydraulic friction between the fluids being pumped and the well conduits that transport the fluids from surface to the subterranean reservoir. These are often referred to as friction reduction chemicals. Without the friction reduction chemicals, the amount of hydraulic horsepower required to inject fluids into the well becomes higher requiring more surface pumping power and equipment thereby, drastically increasing the cost of a stimulation treatment. Hence, one often faces the dilemma whereby if one performs a stimulation or hydraulic fracture treatment without friction reducer chemicals in the fluid, the cost of injection is much higher due to energy costs, but if one opts to mix at surface friction reduction chemicals in the stimulation or hydraulic fracture fluid to reduce horsepower requirements, damage to the subterranean reservoir from said friction reducers occurs.

Furthermore, as fluids are flowed back to the surface after the injection process these flowed-back fluids containing chemicals used during the injection cause environmental damage to the surface environment and to well tubular that transduce them to surface. This damage can be scale deposits in the well casing, corrosion in the well casing, and detrimental effects on surface flow back equipment. Often to reduce the surface damage to the environment, the fluids must be treated with additional chemicals at the surface or specially disposed of at surface, further increasing the cost to using fluids and chemicals on injection jobs like said stimulation and fracture treatments.

Moreover, there are other problems with these injected fluids when they are produced back from the wells. Typically, they must be treated in order to be reused on a subsequent stimulation or hydraulic fracture treatment or disposed of in a safe and environmentally proper manner. There are many detrimental issues with this produced-back stimulation fluid, mostly owing to the fact that the produced-back fluids are complex mixtures of a number of chemical materials and are further contaminated from the subterranean environment after the injection process and often contain bacteria, salts, scales, gases, enzymes, viruses, and other materials that are not suitable for surface handling, disposal or re-injection into wells during a subsequent stimulation or hydraulic fracture process.

The current method used by those familiar with the art of treating stimulation fluids is to mix chemical compositions, including but not limited to, friction reducers, gelling agents, crosslinkers, surfactants, into fluids at surface prior to injecting them down a well casing or tubing. These compositions are typically batch-mixed into the stimulation fluids to be injected at surface into large holding tanks, known as "frac tanks", surface pits, and ponds, or the chemicals are added on the fly at surface by injecting them into the discharge of a large centrifugal pump at surface, allowing for a large amount of shear to be introduced to the mixing of the chemicals with the stimulation injection fluid. The fluid mixture, after mixing at the centrifugal pump is then often pumped through high pressure pumps to allow the fluids to be injected into the well and subsequently the reservoir at very high pressures and normally high injection rates, thereby exceeding the fracture pressure of the reservoir rock. This process is often referred to as "hydraulic fracturing". These compositions injected at surface often reduce the hydraulic friction pressure developed between the well tubular and the fluids being pumped down the well hence the required hydraulic horsepower for the injection, but the result is that the chemicals mixed at surface often cause residual damage to the reservoir. The damage often diminishes subsequent production of hydrocarbons from the reservoir. This damage results in part, because these chemicals, usually large polymer chains, have long molecular structures and significant surface tension, making their recovery from the reservoir rock during stimulation flow back difficult. Furthermore, the stimulation fluids having the chemicals mixed into them at surface, and having a certain amount of oxygen entrained from the surface mixing process, react in-situ in the reservoir enhancing bacterial growth and resulting in unwanted gas, bacterial growth, fluid pH modifications and scale. These surface-mixed chemicals and fluids combine in the reservoir with heat and oxygen from the surface to accelerate bacteria growth in the stimulation fluid leading to the detrimental generation of in-situ gases, bacteria, fluid pH modifications, and scale, that combine with these reservoir fluids and polymers to cause corrosion and scale precipitation to occur in the reservoir and well. Furthermore, these chemicals and fluids, when flowed back to the well surface, result in toxic surface fluids that are note easily and inexpensively disposed. Finally, the flowed back stimulation fluids with the injected chemicals and fluids now representing bacterial loaded fluids are unsatisfactory to re-inject during subsequent well stimulation treatments.

Another method used by those familiar with the art of treating stimulation fluids is to add a cross-linker chemical to a gelled fluid at surface. The gel is often batch mixed into surface frac tanks, and then the cross-linker is added in a centrifugal pump thereby mixing the batch mixed geld fluids from the frac tank with the fluid containing the cross-linker at the surface in the centrifugal pump. The viscosity of the cross-linked fluid composition increases as combined fluids go through high pressure positive displacement pumps and proceed down the well, thereby allowing the cross-linked fluid to transport a slurry of particles, known as "proppants" to those of skill in the art, into the reservoir rock. In this technique of adding crosslinker fluids at surface, it is desirable that the combination of cross-linker and gelled fluid be designed to achieve maximum viscosity to transport proppants into the reservoir, that is maximum crosslinking, approximately when the mixed fluids are near the depth of the perforations. If crosslinking occurs in the fluid too quickly, then there will be excessive viscosity developed in the fluid being transported through the well tubulars causing increased fluid hydraulic friction between the fluid and the well conduit too early in the transport time of the fluid in the well conduit, thereby causing the surface injection pressure to become excessively high and resulting in the need for more surface hydraulic horsepower to inject the fluids. This timing of cross linking is difficult to achieve in practice as it is a function of the well depth, well temperature, fluid pH, fluid temperature, gel and crosslinker mixing proportions achieved on surface in a dynamic "on the fly" mixing process, and the injection rate of the fluids. Currently, the crosslinking effect cannot be quickly controlled and changed from surface as the fluids in the well have already been mixed at surface and because the reservoir being injected to can be miles away in depth from the surface, hence the transient time between the time at which the crosslinked fluid is injected at surface and the time at which it arrives at the perforations in the reservoir is typically longer than is desirable. In a stimulation treatment, it is often useful to control and change rapidly the crosslinking effect and the resulting viscosity of the injected fluids. For example, one may desire to keep the viscosity low while the fluid is in the pipe to reduce the hydraulic horsepower required to inject the stimulation fluids but just as the injected fluid begins to enter the perforations one might want the viscosity to increase rapidly. However, when surface mixing crosslinkers or other fluid viscosity modifiers, it very difficult to rapidly change the friction pressure of the fluids by the effect of crosslinking of the gelled fluid. This is due to a number of reasons, including the significant distances that the fluid being injected must travel from the surface to the reservoir and resulting long transit time. A still further problem presented by current oil and gas industry methods of crosslinking and viscosity-modifying fluids is that is in many wells, fluids are injected in large zones separated by many thousands of feet. It often occurs during the course of a stimulation treatment that a particular portion of the injection zone takes a disproportionate amount of the stimulation treatment and a method to change the injection profile during the job is needed. This is often referred to in the art as diverting the fluids or conformance control of the injection profile.

What is needed is a method to reduce the damage done in-situ to hydrocarbon reservoirs and subsequently the environmental damage done on the surface of the earth and sea by the flow back to surface of these fluids and chemicals injected to wells. A further need is to more accurately and quickly control injection fluid viscosity from surface with a downhole mixing method. A still further need is to change the injection profile of injection fluids using a down hole injection and mixing method for chemicals and insitu methods to monitor the same. Another need is to actively treat the injection fluids during their flow back to surface after a stimulation job.

BRIEF SUMMARY OF THE INVENTION

The present invention is directed to a new method and apparatus to treat well stimulation fluids in-situ thereby improving the control on viscosity effects of said fluids due to cross linkers, gels, and polyacrylamides, thereby reducing the damage that stimulation fluids and chemical have on reservoir productivity, controlling dynamically during a stimulation process the injection profile of fluids into the reservoir, and improving the environmental quality of the flow back of said stimulation treatment fluids when they are flowed back to the surface of the earth or sea. The present method also aids in the recovery of naturally-occurring subterranean reservoir fluids such as oil and natural gas.

In one aspect of the invention, there is a method for the management and injection of fluids into subterranean reservoirs comprising the steps of: (a) constructing a well in the earth comprising a wellbore and a first conduit inserted inside the wellbore, the first conduit forming a fluid path from a location at or above surface to at least one subterranean reservoir; (b) inserting a second conduit inside the wellbore with a first end of the second conduit at or above the surface and a second end of the second conduit inside the wellbore at a point below the surface, the second conduit and the first conduit in fluid communication with one another at a mixing point below the surface; (c) injecting a first fluid into the first conduit at the surface and into a subterranean environment; and, (d) injecting a second fluid into the second conduit at the surface and into a subterranean environment to cause mixing of the second fluid with the first fluid at, or downstream from, the mixing point.

In some embodiments, at least one of the first fluid and the second fluid is a fluid containing a gelling agent. One example of a gelling agent is hydroxypropyl guar.

In some embodiments, at least one of the first fluid and the second fluid is a fluid containing a friction reducer. On example of a friction reducer is polyacrylamide.

In some embodiments, at least one of the first fluid and the second fluid is a fluid containing a bactericide.

In some embodiments, at least one of the first fluid and the second fluid is a fluid containing a component selected from the group consisting of a cross-linking agent, an oxidizer, and any combination thereof. One example of an oxidizer is hydrogen peroxide.

In some embodiments, one of the first fluid and the second fluid comprises a gelling agent and the other of the first fluid and the second fluid comprises a crosslinking agent and wherein the first fluid and the second fluid are simultaneously injected. In some embodiments, the method further comprises injecting a fluid comprising an oxidizer in one of the first or second conduits. In some embodiments, one or both of the first fluid and the second fluid comprises solids. Examples of solids for use in the method include bauxite particles, ceramic particles, catalyst particles, and combination thereof.

In some embodiments, the method further comprises the step of flowing fluids to the surface during one or both of the steps of injecting the first fluid and injecting the second fluid.

In some embodiments, the method further comprises the step of injecting a fluid comprising a surfactant. In some embodiments, the method further comprises the step of injecting a fluid comprising a scale inhibitor. In some embodiments, the method further comprises the step of injecting a fluid comprising a pH modifier.

In some embodiments, the method further comprises the step of remotely measuring a well condition through a communication line, the communication line linking a subterranean environment to the surface, the communication line runs along the inside or along the outside of the first conduit, the second conduit, or both. In some embodiments which have a communication line running along the inside or along the outside of one or both of the first and second conduits, the wellbore is a wellbore having perforated intervals along its length and the method further comprises the step of repositioning the first conduit, the second conduit, or both, relative to the perforated intervals of the wellbore. In some embodiments, the communication line comprises an optical fiber. In some embodiments utilizing an optical fiber, the optical fiber is connected to an optical time domain reflectometry instrument.

In some embodiments, the wellbore is a wellbore having perforated intervals along its length and the method further comprises the step of repositioning the first conduit, the second conduit, or both, relative to the perforated intervals of the wellbore.

In another aspect of the present invention, there is apparatus for management and injection of fluids into subterranean reservoirs, the apparatus comprising a wellbore extending from the surface to a subterranean region; a first conduit within the wellbore, the first conduit comprising a fluid path from a location at or above surface to at least one subterranean reservoir, the first conduit coupled to a fluid reservoir at the surface; a second conduit within the wellbore, the second conduit comprising a fluid path for transporting a fluid from a location at or above surface to a location below the surface, the second conduit further comprising a communication line extending from a location at or above surface to a location below the surface the surface, the second conduit coupled to a fluid reservoir at or above the surface; and, a mixing point below the surface, the mixing point fluidly coupling the first conduit to the second conduit.

In some embodiments of the apparatus, the communication line comprises an optical fiber. In some embodiments having an optical fiber communication line, the apparatus further comprises an optical time domain reflectometer coupled to the optical fiber.

In another aspect of the present invention there is method for the management and injection of fluids into subterranean reservoirs comprising the steps of (a) constructing a well in the earth comprising a wellbore and a first conduit inserted inside the wellbore, the first conduit orming a fluid path from at least one subterranean reservoir to a location at or above surface; (b) inserting a second conduit inside the wellbore with a first end of the second conduit at or above the surface and a second end of the second conduit inside the wellbore at a point below the surface, the second conduit and the first conduit in fluid communication with one another at a mixing point below the surface; (c) injecting a first fluid from the surface through the second conduit and past the mixing point and, (d) producing a second fluid to the surface through the first conduit. In some embodiments, the first fluid is a fluid containing a gelling agent. One example of such a gelling agent is hydroxypropyl guar. In some embodiments, the first fluid is a fluid containing a friction reducer. One example of such a friction reducer is polyacrylamide. In some embodiments, the fluid is a fluid containing a bactericide. In some embodiments, the first fluid is a fluid containing a component selected from the group consisting of a gelling agent, a crosslinking agent, an oxidizer, and any combination thereof. One example of an oxidizer is hydrogen peroxide.

In some embodiments, the first fluid comprises solids. Examples of such solids include bauxite particles, ceramic particles, catalyst particles, and any combination thereof.

In some embodiments, the first fluid comprises a surfactant.

In some embodiments, the method further comprises the step of remotely measuring a well condition through a communication line, the communication line transmitting data from a subterranean environment to the surface, the communication line runs along the inside or along the outside of the first conduit, the second conduit, or both. In some embodiments, the communication lines comprises an optical fiber. In some embodiments using an optical fiber, the optical fiber is connected to an optical time domain reflectometry instrument. In some embodiments, the wellbore is a wellbore having perforated intervals along its length, and the method further comprises the step of positioning the level of the first conduit, the second conduit, or both, relative to the perforated intervals of the wellbore.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

DETAILED DESCRIPTION OF THE INVENTION

As used herein, "a" or "an" means one or more. Unless otherwise indicated, the singular contains the plural and the plural contains the singular.

As used herein, "surface" refers to locations at or above the surface.

Figure 1:
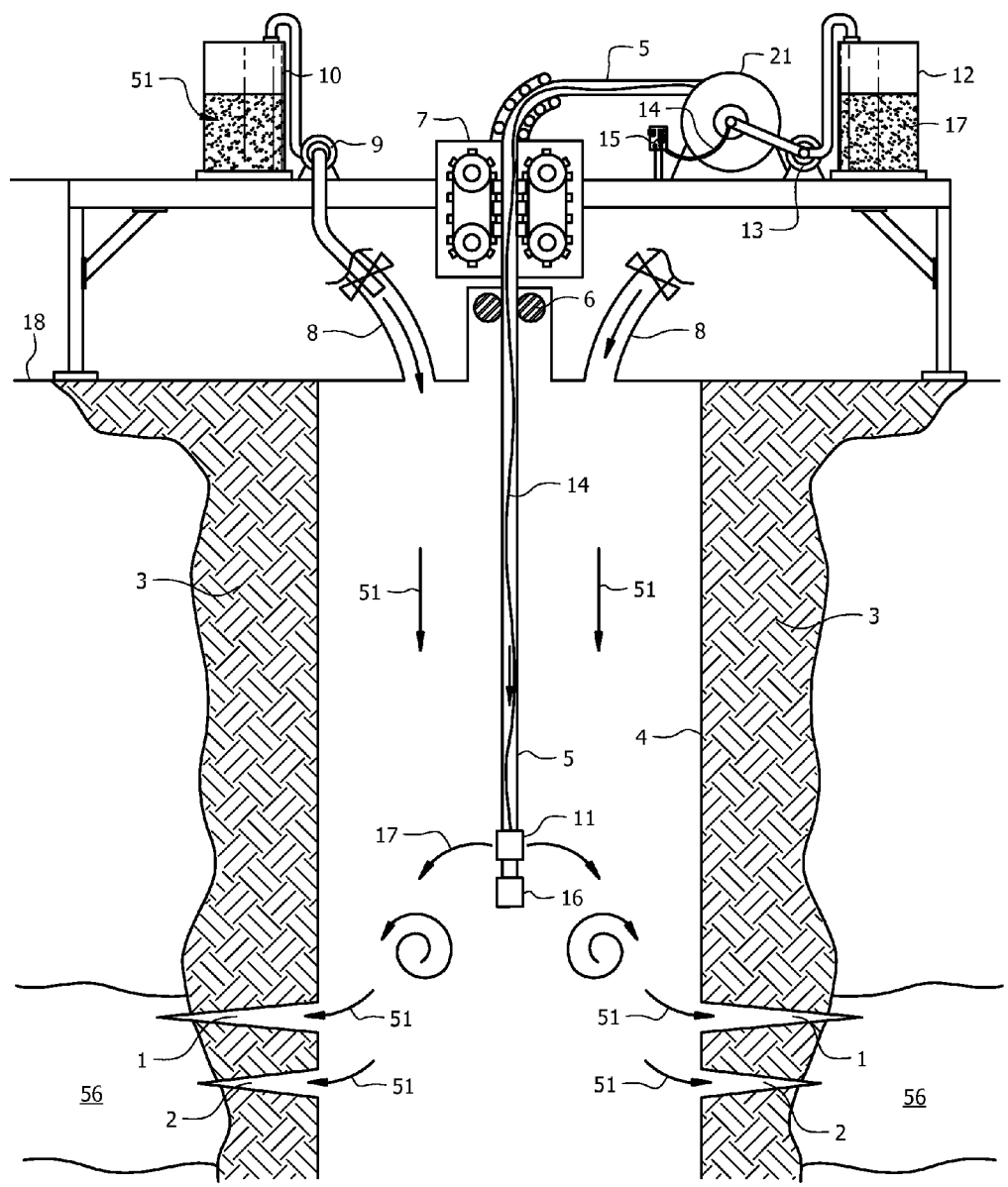
FIG. 1 illustrates an embodiment showing subterranean mixing of fluids introduced through separate conduits.

Attention is first directed to FIG. 1 wherein the preferred embodiment is shown. In the preferred embodiment of this invention, there is a well construction method method where a first conduit 4 commonly known to those familiar with the art of well construction as casing is deployed into the earth 18 through the well bore 3. Casing 4 is grouted into a well bore 3 in the earth 18 generally referred to as a well bore 3. A second conduit, shown in FIG. 1 as conduit 5, may be deployed into the well bore 3 through the casing 4. Conduit 5 may be a continuous length of tubing, referred to as coiled tubing, and is lowered and extracted from the well through an elastomeric sealing device 6 separating the well pressure environment from the surface environment. It should be understood that although coiled tubing and injector heads is preferred and discussed in this example, any other conduit material, deployment method, and extraction method, familiar to those of ordinary skill in the art, may be used. For example, powered spooling drums, drilling rigs and work over rigs with jointed pipe may be used instead of, or in addition to coiled tubing. The coiled tubing 5 is lowered and extracted from the well with a coiled tubing injector device 7 that mechanically engages the coiled tubing 5 to push or pull it into the well. It is clearly understood to those familiar with the art of well construction that the coiled tubing can be replaced with other types of tubing, such as with jointed tubing that is threaded and lowered into the well with a rig and that the coiled tubing or jointed tubing can be lowered into well tubing or casing but without changing the herein disclosed inventive method.

The embodiment shown in FIG. 1 includes a fracture head or well head manifold 8 connected to the casing 4 for the injection of fluids from the surface into the casing 4. Manifold 8, together with the region that is within casing 4 yet outside of conduit 5 to which manifold 8 is fluidly coupled, comprises the first conduit (as distinguished from the second conduit 5). The stimulation fluid 51 to be injected is pumped from at least one tank or blender 10 through at least one pump 9 into the casing 4 through manifold 8. The fluid 51 for the purpose of this embodiment is a water based fluid with a polyacrylamide, a friction reducer fluid, mixed into it and is transmitted through the casing 4 and injected through the perforation tunnels 2 into at least one subterranean reservoir 1. During the injection process of the preferred embodiment, another fluid 17 is injected down the coiled tubing 5 to mixing point 11. For the purpose of this embodiment fluid 17 is a fluid like hydrogen peroxide that breaks the long chain polymer bonds of polyacrylamide fluid 51 as they are mixed at injection point 11 and continue into the subterranean reservoirs. The position of the mixing point 11 in the well may be modified during the injection process by lowering or raising the coiled tubing 5 with the tubing injector device 7. In preferred embodiments, mixing point 11 comprises an injection valve on coiled tubing conduit 5, although mixing point 11 can take any form whereby the fluid paths defined by coiled tubing conduit 5 and that of manifold 8 and the interior of casing 4 come into fluid communication with one another. Injection valve 11 preferably contains a back pressure valve or be in combination with a back pressure valve on the coiled tubing 5 in order to keep fluids 51 from the casing 4 from entering the coiled tubing 5. The second fluid 17 being injected into the well through coiled tubing 5 is pumped from at least one tank 12 at surface through a surface pump 13 into the coiled tubing 5, which may be partially wound on a coiled tubing reel 21. Although the described preferred embodiment deals with wells and formation having perforated intervals, it should be noted that the method is also applicable to wells and formations which do not have perforated intervals. Such perforated intervals can be those that are naturally-occurring and those that are formed by use of explosive charges when drilling the well.

In the preferred embodiment there is also a data communication line 14 inside the coiled tubing 5 connected at surface to a data collection device 15. This data communication line can be connected to a pressure and temperature measurement and/or recorder 16 connected and disposed in the casing 4 on the coiled tubing 5. The data communication line 14 can be an optical fiber transferring data from the subterranean environment to the surface. The data is collected using analytical and/or recording device 15. Although device 15 is shown at the surface in the FIG. 1, it should be understood that the analytical data may be collected and recorded in a subterranean environment also. One non-limiting example of device 15 is an Optical Time Domain Reflectometer (OTDR) that launches light down the optical fiber 14 disposed in the coiled tubing 5 and measures the backscattered light up the optical fiber 14 to surface where it is interpreted in the OTDR device at surface to yield a distributed temperature profile versus depth along the length of the fiber. Other optical, electrical, hydraulic, nuclear, acoustic, and spectroscopic measurements may be used to remotely gather information regarding well conditions, with the resulting data then transmitted via the communication line 14. Preferably this communication transmits real-time data, which can be used to optimize the injection profile of fluids into intervals 1 and 2 in real-time. Various fluids and injection methods including, colloidal suspensions, solids and gases can be injected down coiled tubing 5 to affect the injection fluid process where said fluids may include additives that affect, among other things, viscosity, composition, pH, temperature, pressure, and flow rate. Other recording and/or analytical devices, known to those of skill in the art, which measure and/or record temperature, pressure, radio-activity, composition, and/or any other relevant parameters may be used, either alternatively or additionally. The communication line 14 may also be an electronic communication line that sends and receives electronic data communications relating to well conditions. As for the case for an electronic communication line, wherein an electronic communication line is used, it is preferable that any data transmitted is transmitted in real-time to permit real-time optimization of fluid injection.

Additionally, the point or points of data gathering with the data temperature measurement and/or recorder 16 and the distributive sensor optical fiber 14 can be affected similarly by raising or lowering the coiled tubing 5 with the tubing injector device 7.

Figure 2:
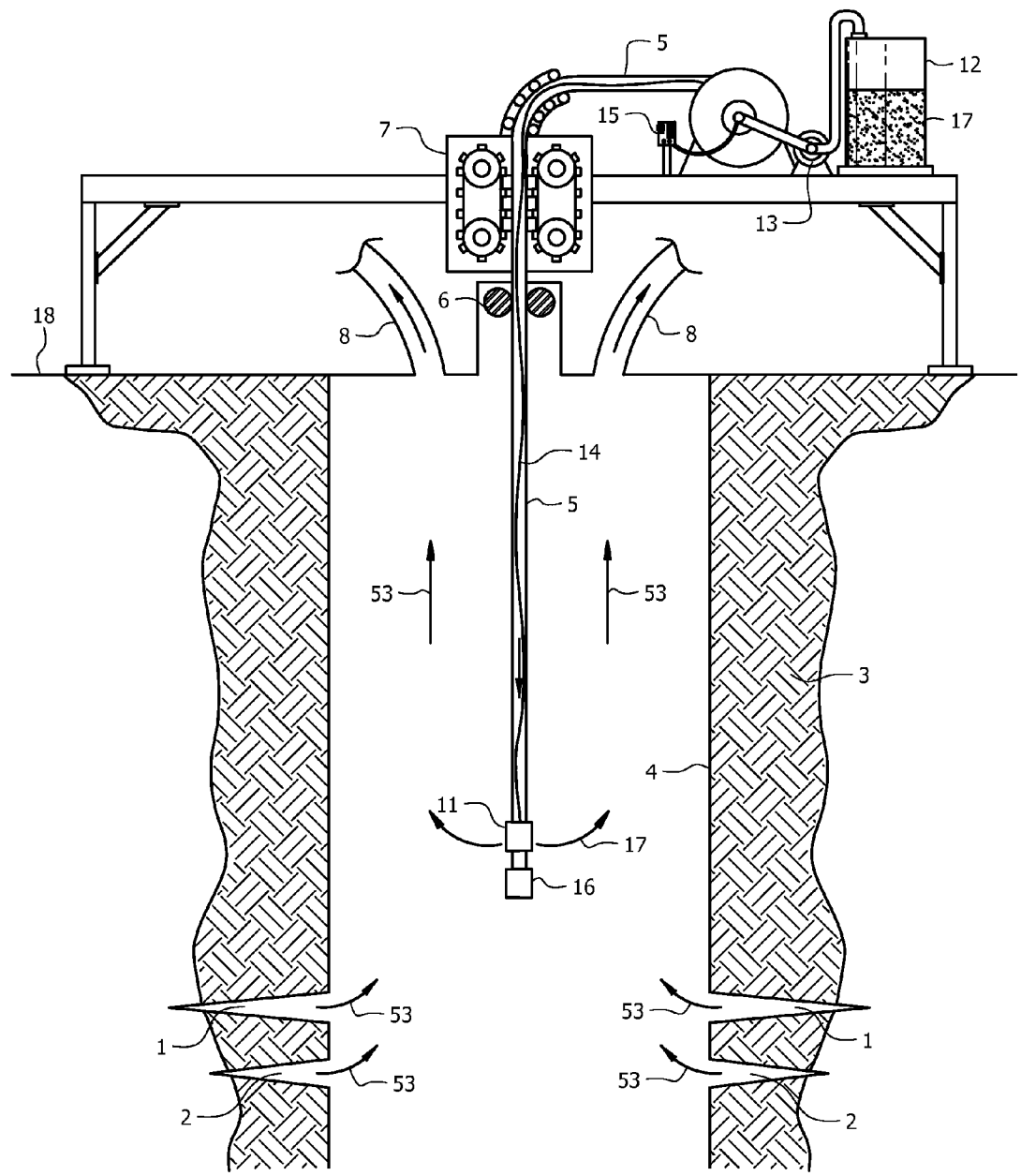
FIG. 2 illustrates an embodiment showing production of fluids back to the surface up one well conduit whilst simultaneously injecting a fluid into the well through a second conduit.

FIG. 2 illustrates another embodiment in which a fluid 17 is injected into second conduit 5 while fluids comprising injected fluid and reservoir fluids 53 are produced up the first conduit which comprises the volume of casing 4 outside of second conduit 5 and manifolds 8. In a preferred embodiment, fluids from reservoir 1 and 2 are produced back through the perforations 2 into the casing 4 and back to the surface through manifold 8 or a wellhead while simultaneously injecting a fluid 17 like hydrogen peroxide from the surface tank 12 through the coiled tubing 5 into the casing 4. This simultaneous injection of hydrogen peroxide into the well casing 4 while the well is flowing back fluid 53 further treats the fluids 53 in the well thereby reducing and killing bacteria and polymers in the flowed back fluids 53. It is understood that, in addition to, or in lieu of the fluid hydrogen peroxide, many combinations of other compositions can be added to the coiled tubing of 5, including but not limited to, bactericides, oxidizers, surfactants, acids, salts, pH modifiers, scale inhibitors and their various concentrations and combinations can be used in this process without deviating from the scope of the invention. This embodiment also teaches that the injection point 11 can be changed to be above or below the perforated interval 1 and or 2 before during and after the fluid is being injected down coiled tubing 5 while fluids 53 are flowing or when the fluids of 53 are not flowing. For example, the coiled tubing 5 with the optical fiber 14 can be lowered with injector head 7 to below both perforated intervals 1 and 2 and an optical survey of the distributive temperatures of the well bore maybe taken by launching light from the OTDR device 15 while the well fluids 53 are flowing. Conversely, the OTDR well temperature profile survey can be obtained when fluids 53 are not flowing.

Figure 3:
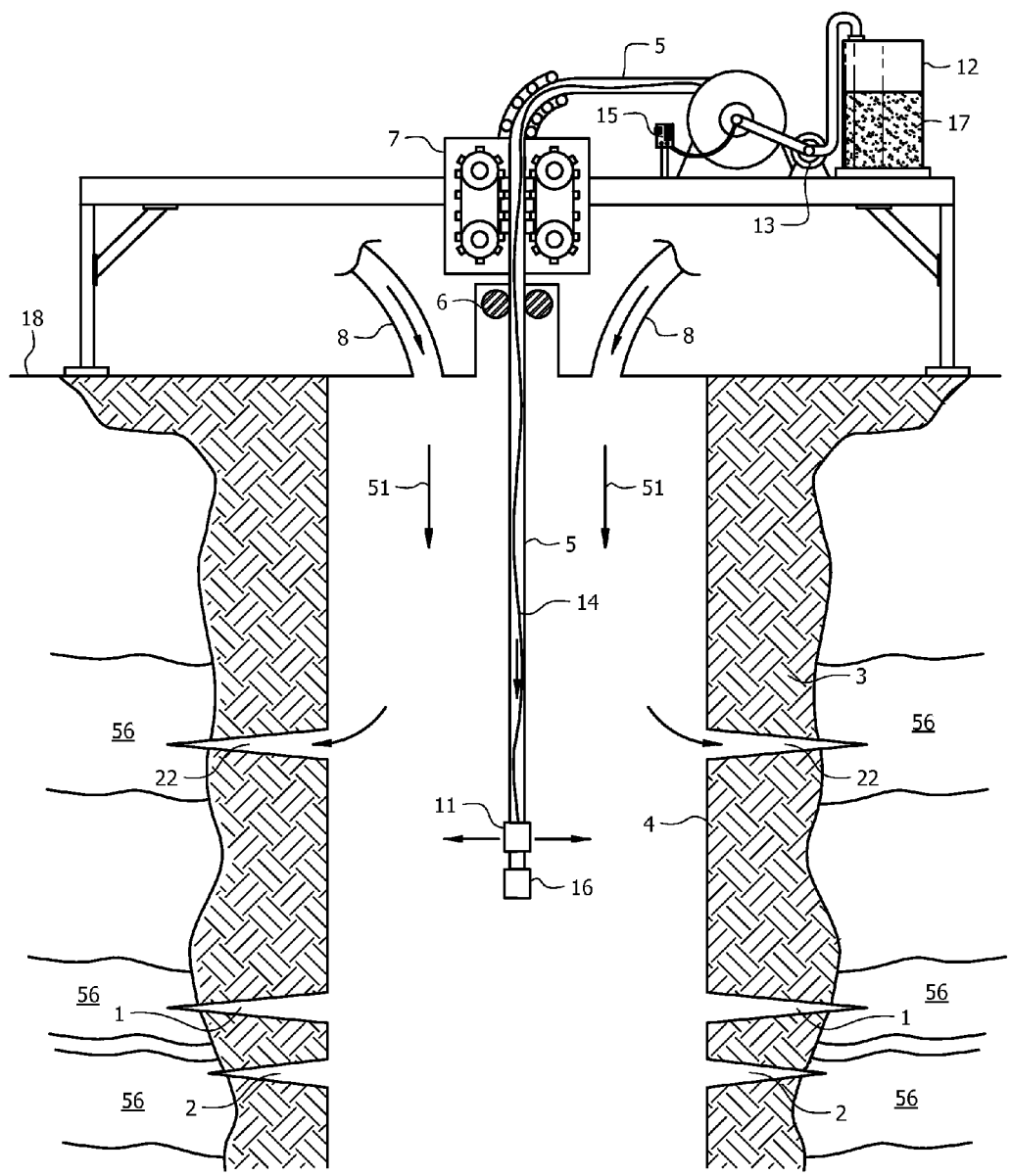
FIG. 3 illustrates an embodiment showing a point of fluid mixing located below at least one perforation intervals in a well formation.

Attention is directed to FIG. 3, which is a specific sub-embodiment of the embodiment of FIG. 1 wherein the coiled tubing 5 with data communication line 14 disposed in the coiled tubing 5 is lowered to point below at least one perforated interval 22 at sometime during the injection process. As a result, mixing point 11 is below at least one perforated interval 22. This lowering or raising of the coiled tubing 5 in the well can take place at any time during the injection process or after the injection process and the depth of mixing point 11 can be selected by monitoring the distributive temperature profiles of the well on the OTDR (and/or other analytical device). The injection of crosslinker material can be increased down the coiled tubing 5 such that it causes the fluid 51 being injected from surface through the casing 4 to have a higher viscosity below the perforated interval 22 thus diverting more of the stimulation fluid being injected down the casing 4 into the upper perforated intervals at 22. Many perforated intervals can be treated in a well in this manner by diverting the fluids from the bottom-most perforations sequentially up the well by injecting a viscosity modifier through the coiled tubing, and then adjusting (raising or lowering) the coiled tubing injection depth in the well. By thus varying the location of the down-hole mixing, the viscosity profile and hence the fluid injection profile into multiple well intervals can be manipulated.

Referring now to FIG. 1 in the preferred embodiment, a fluid composition 51 is injected, from a surface tank 10 through a pump 9 wherein the composition comprises a friction reducer chemical such as polyacrylamide. The composition may comprise solids added at the surface. The friction reducer can be blended into the composition (which may be water) in the tank 10 or added at the pump 9 at surface; in either case the friction reducer is added to the composition being injected into the well casing 4. The composition comprising the friction reducer is then pumped through the manifold 8 into the casing 4 and into the perforations. Simultaneously, while the composition is being pumped down the casing 4, an oxidizer fluid (such as a fluid comprising hydrogen peroxide) is injected down the coiled tubing 5 from a surface tank 12 through a pump 13 and into the coiled tubing 5 the well casing through the mixing point 11 where the hydrogen peroxide mixes with the composition in the casing 4 at a depth in the well denoted by 11. In the preferred embodiment the distal end of the coiled tubing and the mixing point 11 (preferably an injection valve) are located at a well depth which is approximately 100 feet above the depth of perforated intervals 1 and 2. In the preferred embodiment the perforated depth and the casing are located several thousands of feet below the surface of the earth 18. This allows the friction reducer to form a friction reducing film on the internal diameter of the casing 4 and the outer diameter of the coiled tubing 5 from the surface depth 18 to the depth 11 thereby maximizing the effect of the friction reducer to reduce fluid friction between the injection fluid and the well conduits during the injection. Just above the perforated interval at depth 11, the mixing of the hydrogen peroxide 17 begins a process of breaking down the long polymer chains of the polyacrylamide thereby reducing its molecular length and reducing its adhesion and plugging to reservoir porosity and permeability upon prior to fluid 51 entering the reservoirs 56.

In the preferred embodiment of FIG. 1, the down-hole pressure is recorded at the recorder 16 and is read at the surface from the data recording device 15, preferably in real time with the simultaneous injection of the hydrogen peroxide down the coiled tubing 5 and the composition comprising friction reducer 51 down the casing 4. Attention is directed to FIG. 2 which further teaches that once the injection process is completed, the fluid injected into subterranean reservoirs 1 and 2 is produced back into the casing 4 and back to the surface of the earth 18 through manifold 8 or a wellhead while simultaneously injecting a fluid 17 hydrogen peroxide from the surface tank 12 through the coiled tubing 5 into the casing 4. This simultaneous injection of hydrogen peroxide into the well casing 4 while the well is flowing back the stimulation fluid 53 further treats the injection fluids in the well thereby reducing and killing bacteria and polymers in the flowed back fluids. It is understood that many combinations of chemicals can be added to the coiled tubing of 5 including bactericides, oxidizers, surfactants, acid, and their various concentrations and combinations can be used in this process without deviating from the scope of the invention.

In another embodiment, the injection process shown in FIG. 3 comprises the injection of a water based fluid 51 with a gelling agent (for example, hydroxypropyl guar (HPG)) blended into water and pumped at the surface down into the well having perforated intervals 22, 1, 2. The fluid is injected through manifold 8 through the casing 4 while a crosslinker fluid (or other viscosity enhancer for fluid 51) is injected down the coiled tubing 5 and mixed into the gelled fluid atthrough mixing point 11, whereby the blended fluids 51 continue down the casing 4 being transported into the perforated interval 22 and into a subterranean reservoir 56. By injecting the crosslinker fluid down coiled tubing 5 and mixing with fluid 51 at mixing point 11 the viscosity of fluid 51 in the casing 4 below the perforated interval 22 is higher thereby affecting the injection profile such that fluid 51 is diverted to the upper interval 22 and less to the lower intervals 1 and 2. In a still further embodiment, a fluid 51 with a catalyst is injected down the casing 4 of FIG. 1 while hydrogen peroxide is injected down the coiled tubing 5 and injected through the injection valve 11 into the casing 4 where the catalyst and the hydrogen peroxide mix in the well and are injected into the reservoir 1 through the perforations 2 and 1. In some embodiments, the fluid 51 injected down the casing 4 contains a fuel and a magnesium oxide that decomposes or otherwise neutralizes the hydrogen peroxide in the subterranean environment.

It should be understood that an almost unlimited combination of gelled fluids, catalyst, fuels, surfactants, and oxidizers can be added to the fluid 51 being pumped down the well casing 4 to be mixed with almost unlimited combination of fluids 17, catalyst, fuels, surfactants, acids, and oxidizers being injected simultaneously down the coiled tubing 5. In a preferred embodiment, the use of an analytical instrument to collect, transmit, and possibly record down-hole well information, preferably in real-time at surface, allows for the optimization of the injection of fluids rate and positioning of the injection point. For instance, if data collected indicates an increase in pressure in one or more conduits supplying fluids to the subterranean environment, one may increase the concentration of friction reducer or otherwise change the composition of friction reducer (for example, going from one friction reducer to another friction reducer) to optimize performance. Likewise, the optical fiber that is a distributive sensor may indicate that a particular injection profile is developed during the fluid injection profile and the location of the injection point of the coiled tubing, or changes in the fluids being injected can be made at surface to modify the injection profile. Other examples of optimization should be immediately clear to those of skill in the art.

It should also be understood that in any of the embodiments discussed, the compositions injected may be those that increase or decrease viscosity of a resulting fluid when the injected fluid mixes with another fluid. Alternatively, other characteristics of the resulting fluid can be modified by injecting various compositions, including, but not limited to, pH modifiers, scale inhibitors, corrosion inhibitors, bacterial contamination inhibitors (such as bactericides), surfactants (to modify surface tension), etc. Variables such as injection and production pressure and flow can be manipulated as well to fine-tune the injection to optimize specific properties. These variables can be changed in real time in response to data collected and monitored using the analytical instrumentation and recording devices described herein.

Although the present invention and its advantages have been described in detail, it should be understood that various changes, substitutions and alterations can be made herein without departing from the spirit and scope of the invention as defined by the appended claims. The examples given are merely illustrative and not exhaustive. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the invention is intended to encompass within its scope such processes, machines, manufacture, compositions of matter, means, methods, or steps.

What is claimed is:

1. A method for the in-situ treatment of stimulation fluids comprising the steps of:
   (a) constructing a well in the earth comprising a wellbore and a first conduit inserted inside said wellbore, said first conduit forming a fluid path from a location at or above surface to at least one subterranean reservoir;
   (b) inserting a second conduit inside said wellbore with a first end of said second conduit at or above the surface and a second end of said second conduit inside said wellbore at a point below the surface, said second conduit and said first conduit in fluid communication with one another at a mixing point below the surface;
   (c) simultaneously injecting a first fluid into said first conduit at the surface and into a subterranean environment, said first fluid comprising a stimulation fluid;
   (d) injecting a second fluid into said second conduit at the surface and into a subterranean environment to cause mixing of said second fluid with said first fluid at, or downstream from, said mixing point, said second fluid comprising a fluid that modifies the viscosity of said stimulation fluid;
   wherein said wellbore is a wellbore having perforated intervals along its length; and
   (e) repositioning the first conduit, the second conduit, or both, relative to the perforated intervals of said wellbore, the step of repositioning the first conduit, the second conduit, or both, relative to the perforated intervals of said wellbore occurs while injecting fluid into said well.

2. The method of claim 1, wherein said first fluid comprises a gelling agent.

3. The method of claim 2 wherein said gelling agent is hydroxypropyl guar.

4. The method of claim 1, wherein said first fluid comprises a friction reducer.

5. The method of claim 4, wherein said friction reducer is polyacrylamide.

6. The method of claim 1, wherein at least one of said first fluid and said second fluid is a fluid containing a bactericide.

7. The method of claim 1 wherein said second fluid comprises a component selected from the group consisting of a cross-linking agent, an oxidizer, and any combination thereof.

8. The method of claim 7, wherein said oxidizer is hydrogen peroxide.

9. The method of claim 1, wherein one of said first fluid comprises a gelling agent and said second fluid comprises a crosslinking agent.

10. The method of claim 9, further comprising injecting a fluid comprising an oxidizer in one of said first or second conduits.

11. The method of claim 1, wherein one or both of said first fluid and said second fluid comprises solids.

12. The method of claim 11, wherein said solids comprise a component selected from the group consisting of bauxite particles, ceramic particles, catalyst particles, and any combination thereof.

13. The method of claim 1, further comprising the step of flowing fluids to the surface during one or both of said steps of injecting said first fluid and injecting said second fluid.

14. The method of claim 1, further comprising the step of injecting a fluid comprising a surfactant.

15. The method of claim 1, further comprising the step of injecting a fluid comprising a scale inhibitor.

16. The method of claim 1, further comprising the step of injecting a fluid comprising a pH modifier.

17. The method of claim 1, further comprising the step of remotely measuring a well condition through a communication line, said communication line linking a subterranean environment to the surface, said communication line runs along the inside or along the outside of said first conduit, said second conduit, or both.

18. The method of claim 17, wherein said communication line comprises an optical fiber.

19. The method of claim 18, wherein said optical fiber is connected to an optical time domain reflectometry instrument.

20. An apparatus for the in-situ treatment of stimulation fluids, said apparatus comprising:
   a wellbore extending from the surface to a subterranean region;
   a first conduit within said wellbore, said first conduit comprising a fluid path from a location at or above surface to at least one subterranean reservoir, said first conduit coupled to a fluid reservoir at the surface, said fluid reservoir comprising a stimulation fluid;
   a second conduit within said wellbore, said second conduit comprising a fluid path for transporting a fluid from a location at or above surface to a location below the surface, said second conduit further comprising a communication line extending from a location at or above surface to a location below the surface said surface, said second conduit coupled to a fluid reservoir at or above the surface;

a tubing injector device coupled to said second conduit;

a mixing point below the surface, said mixing point fluidly coupling said first conduit to said second conduit;

wherein said wellbore is a wellbore having perforated intervals along its length; and wherein the first conduit, the second conduit, or both, are repositionable relative to the perforated intervals of said wellbore while fluid is injected into said well.

21. The apparatus of claim 20, wherein said communication line comprises an optical fiber.

22. The apparatus of claim 21, further comprising an optical time domain reflectometer instrument coupled to said optical fiber.

23. A method for in-situ treatment of produced stimulation fluids, comprising the steps of
  (a) constructing a well in the earth comprising a wellbore and a first conduit inserted inside said wellbore, said first conduit forming a fluid path from at least one subterranean reservoir to a location at or above surface;
  (b) inserting a second conduit inside said wellbore with a first end of said second conduit at or above the surface and a second end of said second conduit inside said wellbore at a point below the surface, said second conduit and said first conduit in fluid communication with one another at a mixing point below the surface;
  (c) injecting a first fluid from the surface through said second conduit and past said mixing point, said first fluid comprising a fluid that modifies the viscosity of a stimulation fluid, to form a viscosity-modified stimulation fluid in-situ;
  (d) producing viscosity-modified stimulation fluid to the surface through said first conduit;
  wherein said wellbore is a wellbore having perforated intervals along its length; and
  (e) positioning the level of said first conduit, said second conduit, or both, relative to said perforated intervals of said wellbore while injecting fluid into said well.

24. The method of claim 23, wherein said stimulation fluid comprises a friction reducer.

25. The method of claim 24, wherein said first fluid comprises hydrogen peroxide.

26. The method of claim 23, wherein said first fluid comprises a bactericide.

27. The method of claim 23, wherein said first fluid comprises pH modifiers.

28. The method of claim 23, wherein said first fluid comprises a surfactant.

29. The method of claim 23, further comprising the step of remotely measuring a well condition through a communication line, said communication line transmitting data from a subterranean environment to the surface, said communication line runs along the inside or along the outside of said first conduit, said second conduit, or both.

30. The method of claim 29, wherein said communication lines comprises an optical fiber.

31. The method of claim 30, wherein said optical fiber is connected to an optical time domain reflectometry instrument.

\* \* \* \* \*